US005194072A

United States Patent [19]

Rue et al.

[11] Patent Number: 5,194,072

[45] Date of Patent: * Mar. 16, 1993

[54] SINTERED SOL GEL ALUMINA ABRASIVE FILAMENTS

[75] Inventors: Charles V. Rue, Petersham; Ronald H. van de Merwe, Northborough, both of Mass.; Ralph Bauer, Niagara Falls, Canada; Scott W. Pellow, Niagara Falls, Canada; Thomas E. Cottringer, Niagara Falls, Canada; Richard J. Klok, Niagara Falls, Canada

[73] Assignee: Norton Company, Worcester, Mass.

[*] Notice: The portion of the term of this patent subsequent to Apr. 23, 2008 has been disclaimed.

[21] Appl. No.: 517,914

[22] Filed: May 2, 1990

Related U.S. Application Data

[63] Continuation-in-part of Ser. No. 345,139, Apr. 28, 1990, Pat. No. 5,009,676.

[51] Int. Cl.$^5$ ................................................. C09C 1/68
[52] U.S. Cl. .......................................... 51/309; 51/293
[58] Field of Search .................................. 51/293, 309

[56] References Cited

U.S. PATENT DOCUMENTS

| | | | |
|---|---|---|---|
| 3,183,071 | 5/1965 | Rue et al. | 51/298 |
| 3,387,957 | 6/1968 | Howard | 51/298 |
| 3,481,723 | 12/1969 | Kistler et al. | 51/298 |
| 3,808,015 | 4/1974 | Seufert | 501/95 |
| 4,314,827 | 2/1982 | Leitheiser et al. | 51/309 |
| 4,623,364 | 11/1986 | Cottringer et al. | 51/309 |
| 4,744,802 | 5/1988 | Schwabel | 51/309 |
| 4,786,292 | 11/1988 | Janz et al. | 51/293 |
| 4,788,167 | 11/1988 | Mathers et al. | 501/98 |

FOREIGN PATENT DOCUMENTS

| | | |
|---|---|---|
| 11771 | 5/1912 | United Kingdom . |
| 2055356 | 7/1983 | United Kingdom . |

OTHER PUBLICATIONS

Proceedings of the British Ceramic Society, No. 15 Jan. 1970 pp. 69-83 H. D. Blakelock et al.
Transactions and Journals of the British Ceramic Society 82 Jul.-Aug. 1983 pp. 143-145 J. D. Birchall.
Material Science Research 5, pp. 340-358 (1971, Bailey & Barker).

*Primary Examiner*—Mark L. Bell
*Assistant Examiner*—Willie J. Thompson
*Attorney, Agent, or Firm*—David Bennett

[57] ABSTRACT

A filament shaped sintered alumina based abrasive made up predominantly of fine alpha alumina crystals.

24 Claims, No Drawings

SINTERED SOL GEL ALUMINA ABRASIVE FILAMENTS

This application is a continuation - in - part of U.S. application Ser. No. 07/345,139 field Apr. 28, 1990, now U.S. Pat. No. 5,009,676.

TECHNICAL FIELD

The invention relates to sintered sol gel alpha alumina abrasive filaments useful in bonded abrasive products such as grinding wheels and segments, and in coated products such as belts and disks.

BACKGROUND

Sol gel, and particularly seeded sol gel aluminous abrasives, have demonstrated substantial advantages over other premium abrasives in broad areas of coated and bonded abrasive applications since their introduction some few years ago. Such abrasives are generally made by drying and sintering a hydrated alumina gel which may also contain varying amounts of additives such as MgO or $ZrO_2$. The dried material is crushed either before or after sintering to obtain irregular blocky shaped polycrystalline abrasive grits in a desired size range. The grits may later be incorporated in a bonded or coated abrasive product such as a grinding wheel or a segment or a belt or disk.

U.S. Pat. No. 4,314,827 to Leitheiser et al. discloses abrasive grits made by such a method in which the sintered grits contain irregular "snowflake" shaped alpha $Al_2O_3$ crystals which are on the order of 5 to 10 microns in diameter. The spaces between the arms of a "snowflake" and between adjacent "snowflakes" are occupied by other phases such as a finely crystalline alumina magnesia spinel.

U.S. Pat. No. 4,623,364, which issued on Nov. 18, 1986 assigned to Norton Company, the assignee of this application, discloses a sol gel method for the manufacture of aluminous abrasive grits, and products other than abrasive grits such as coatings, thin films, filaments, rods or small shaped parts, having enhanced properties. In that patent the conversion of the hydrated alumina to alpha alumina is facilitated by the introduction of seed material into the gel or the gel precursor prior to drying. This can be accomplished by either wet vibratory milling of the gel or gel precursor with alpha alumina media, or by the direct addition of very fine seed particles in powder or other form. To make abrasive grits the seeded gel is dried, crushed and fired. The abrasive grits so produced may be used in the manufacture of products such as coated abrasive disks and grinding wheels. Alternatively, to make shaped parts or rods, the material may be formed or molded as by extrusion before firing. In the case of extrusion, the rods formed are later cut or broken into appropriate lengths.

Once the gel has formed, it may be shaped, by any convenient method such as pressing, molding, or extrusion, and then carefully dried to produce an uncracked body of the desired shape. If abrasive material is desired, the gel can be extruded simply spread out to any convenient shape and dried. After drying, the solid body or material can be cut or machined to form a desired shape or crushed or broken by suitable means, such as a hammer or ball mill, to form abrasive particles or grains.

Such seeded sol gel abrasives have a much firmer alpha $Al_2O_3$ crystal structure and higher density than the Leitheiser-type unseeded sol gel material. The alpha $Al_2O_3$ crystals of the seeded sol gel abrasives are submicron and usually on the order of about 0.4 microns and less, although somewhat coarser structure may result if the seeding is performed in a non-optimal manner or if the firing is at too high a temperature, or for too long a duration.

Other materials such as $Fe_2O_3$ can also be used as seeds to facilitate the conversion to alpha $Al_2O_3$. As a rule of thumb, such seeding materials should be isostructural with $Al_2O_3$ and should have similar (within about 15%) crystal lattice parameters to work well.

Thus the sol-gel abrasives previously taught have needed to be formed into grits of the desired size by comminuting the larger particles and grading the product. However this procedure is very wasteful since it results in the production of a wide range of particle sizes, not all of which may be useful. This a significant amount of the production has to be discarded, recycled or used in a low value application.

It has now been found that sintered sol-gel microcrystalline materials having significantly enhanced properties can be obtained directly in a particular highly advantageous configuration not requiring further comminution before use. The enhanced properties are particularly surprising since it was considered that the properties of sol-gel microcrystalline alumina abrasives derived from the crystal size and purity, particularly the absence of impurities that are present in, for example, bauxite and which result in the formation of vitreous matter at the temperature at which alpha alumina is formed.

In addition the use of a direct formulation technique results in far less production of materials for which no immediate need exists. In fact essentially all the material produced is of the desired specifications and the process is significantly more efficient as a consequence.

SUMMARY OF THE INVENTION

The invention relates to sintered sol gel alpha alumina based polycrystalline abrasive filaments. The alpha alumina crystallites in the abrasive filaments may be as large as 2 microns if the gel is not seeded, but, with the preferred seeded gels, are less than 1 micron and with optimal processing, less than about 0.4 micron. Generally speaking, the abrasive properties are found to be significantly improved at the smaller crystallite sizes so that particle sizes of the order of about 0.05 to about 1 micron are often most advantageous. The filaments can be made by preparing a sol gel of a hydrated alumina, spinning or extruding the gel into filaments, drying the filaments, and firing the dried filaments to a temperature of not more than about 1500° C. In its preferred mode, the process includes the addition to the initial sol or gel, an effective amount of a submicron crystalline seed material that promotes the rapid conversion of the hydrated alumina in the gel to very fine alpha alumina crystals when the extruded and dried sol gel is fired. Examples of such seed material are beta alumina, gamma alumina, chromium oxide, alpha ferric oxide, alpha alumina, and precursors of these oxides, as well as other fine debris that will act as nucleation sites for alpha alumina.

The microcrystals are formed by a growth process from a sol-gel since this leads to a fine uniform microstructure, particularly where the sol-gel has been seeded. This growth process is very important and leads to significant differences between products of the invention and those which are formed by sintering compositions that consist predominantly or completely of crystalline particles of alpha alumina. Unless high temperatures (which lead to crystal growth) are used, these latter products tend to have weak sinter bonds between adjacent crystaline particles and so the grains made up of such particles tend to have little strength. By contrast, alpha alumina crystals grown from a sol-gel and sintered in situ, especially those made by a seeded process, can be fired at much lower sintering temperatures to preserve the fine crystal structure.

It is further preferred that the microcrystalline structure be substantially free of impurities that, upon firing, would give rise to glassy material. By "glassy" material is meant amorphous non-crystalline material with no long-term molecular order. Such material significantly weakens the overall particle structure and renders it less effective as an abrasive grain. Thus the particles of the invention contain less than 5% and preferably less than 2% by weight of any such glassy component.

DETAILED DESCRIPTION OF THE INVENTION

For purposes of this application and the invention disclosed herein, the term "filament(s)" is used to refer to elongated ceramic bodies each having a generally consistent cross section along its length with a maximum cross-sectional dimension not exceeding about 1.5 mm, and more preferably, less than about 0.5 mm and wherein the length is at lease as great as, and preferably at least about twice the maximum dimension of the cross section. The abrasive filaments of the invention may be bent or twisted so that the length is measured along the body rather than necessarily in a straight line.

Abrasive filaments are preferably obtained, in general, by extruding or spinning a preferably seeded gel of hydrated alumina into continuous filaments, drying the filaments so obtained, cutting or breaking the filaments to the desired lengths, and then firing the filaments to a temperature of not more than 1500° C.

Various sol gel methods of preparation and firing of gels of hydrated alumina are described in U.S. Pat. Nos. 4,314,827, 4,623,364, and 4,797,139, all of which patents are incorporated herein, in total, by reference. In addition to the hydrated alumina, as disclosed in said patents, the sol may include up to 10–15% by weight of additives such as titania, spinel, mullite, manganese dioxide, magnesia, ceria, zirconia in the form of a powder or a precursor thereof or other compatible additives or precursors thereof provided these do not form vitreous materials at the temperatures at which alpha alumina is formed nor adversely affect the stability of and integrity of the gel as the filaments are formed. These additives may be included to modify such properties as fracture toughness, hardness, friability, fracture mechanics, or drying behavior. In its most preferred embodiment, the sol or gel includes a dispersed submicron crystalline seed material or a precursor thereof in an amount effective to facilitate the conversion of the hydrated alumina particles to alpha alumina upon sintering. The amount of seed material should not exceed about 10% by weight of the hydrated alumina and there is normally no benefit to amounts in excess of about 5%. If the seed is adequately fine (preferably 60m² per gram or more), amounts of from about 0.5 to 10% may be used with 1–5% being preferred. Addition of much more tends to affect the stability of the sol-gel and make filament formation difficult. In addition, there is a large reduction in the strength of the inter-crystalite bonds formed during sintering because pre-formed alpha alumina particles require much higher temperatures to achieve sintering. Of course, such higher temperatures lead to crystal growth and other negative consequences.

Examples of solid, microcrystalline seed materials are beta alumina, alpha ferric oxide, alpha alumina, gamma alumina, chromium oxide, and other fine debris that will provide a nucleation site for alpha alumina, with alpha alumina being preferred. The seeds may also be added in the form of a precursor such as ferric nitrate solution. In general the seed material should be isostructural with alpha alumina and have similar crystal lattice dimensions (within 15%) and be present in the dried gel at the temperatures at which the conversion to alpha alumina takes place (about 1000° to 1100° C.).

The filaments can have any convenient cross-section such as round, square, triangular or star-shaped. For most applications a round cross-section is preferred, but some applications may be better served by others, such as square or triangular.

The green abrasive filaments may be formed from the gel by a variety of methods, such as by extrusion or spinning. Extrusion is most useful for green filaments between about 0.25 and 1.5 mm in diameter which, after drying and firing, are roughly equivalent in diameter to that of the screen openings used for 100 grit to 24 grit abrasive grits, respectively. Spinning is most useful for fired filaments less than about 100 microns in diameter. Fired filaments as fine as 0.1 micron (0.0001 mm) have been made by spinning in accordance with the invention. The green filaments shrink upon firing. For example at 60% solids the filaments shrink about 40% in diameter from their extruded diameter.

Gels most suitable for extrusion should have a solids content of between about 30% to about 68% and preferably about 45% and 64%. The optimum solids content varies directly with the diameter of the filament being extruded, with about 60% solids content being preferred for filaments having a fired diameter roughly equivalent to the screen opening for a 50 grit crushed abrasive grit (about 0.28 mm). As indicated above, attempts to achieve too high a solids content in the gel by incorporating solid materials usually has a severe detrimental effect on the stability of the gel. The extrudate has little green strength as a rule and often will not hold a filamentary shape except at diameters above about 2 mm.

Spinning in accordance with the invention may be performed by placing a quantity of the gel on a disk which is then spun to fling green filaments off, which dry almost immediately in the air. Alternatively, the gel may be placed in a centrifuge bowl having holes or slots drilled in its periphery and the bowl is spun at, for example, 5,000 rpm to form the filaments which are drawn in the process to the denied "green" diameter. Other known spinning methods may also be used to form the green filaments. For spinning the most useful solids content is between about 20% to 45%, with about 35% to 40% being preferred.

If the filaments are being formed by spinning, it is desirable to add about 1% to 5% of a non-glass forming spinning aid, such as polyethylene oxide, to the sol from which the gel is formed in order to impart desirable viscoelastic properties to the gel for filament formation. The optimum amount of spinning aid varies inversely with the solids content of the gel. The spinning aid is burnt out of the filaments during calcining or firing. Since very little of it need be added (generally none at all for extrusion), it does not substantially affect the properties of the fired filaments.

Various desired shapes may be imparted to extruded gel filaments by extruding the gel through dies having the shape desired for the cross section of the filament. If the gel filaments are relatively large in cross section or have been made from a gel containing a large amount of water, it may be necessary or preferable to dry them at a temperature below 100° C. for 24–72 hours before subjecting them to any heating above 100° C. If the gel filaments have a relatively thin cross section or are made from very high solids gels, drying may not be necessary.

It is, of course, anticipated that the filaments of the invention could be dried and fired as essentially continuous filaments that could be used as reinforcing elements in a matrix of, for example, a metal or plastic, where their toughness would be very advantageous.

The initially formed continuous filaments are preferably broken or cut into lengths of the maximum dimension desired for the intended grinding application. In general, any shaping or partitioning operation needed to convert the continuous filaments into discrete bodies or to change their shape is best accomplished at the gel stage, or the dried stage because it can be accomplished with much less effort and expense at these points than by attempting to operate on the much harder and stronger bodies formed after final firing according to this invention. Thus, as the continuous filaments emerge from the extruder die, may be reduced to the desired length filament by any suitable means known to the art, for example, by a rotating wire cutter mounted adjacent the face of the die. Alternatively, the dried filaments may be broken or lightly crushed and then classified to desired ranges of length.

After the gel filaments have been shaped as desired and cut or crushed, and dried if needed, they are converted into final form filaments by controlled firing. The firing should be sufficient to convert substantially all the alumina content of the gel filaments into crystalline alpha alumina, but should not be excessive in either temperature or time, because excessive firing promotes undesirable grain or crystallite growth which leads to a product that is a less effective abrasive in use. Generally, for the preferred seeded gels firing at a temperature of between 1200° C. to 1350° C. for between 1 hour and 5 minutes respectively is adequate, although other temperatures and times may be used. For filaments coarser than about 0.25 mm, it is preferred to prefire the dried material at about 400°–600° C. from about several hours to about 10 minutes respectively, in order to remove the remaining volatiles and bound water which might cause cracking of the filaments during firing. The firing of unseeded gels generally requires higher temperatures and longer times as disclosed in U.S. Pat. 4,314,827. Particularly for filaments formed from seeded gels, excessive firing quickly causes larger grains to absorb most or all of smaller grains around them, thereby decreasing the uniformity of the product on a micro-structural scale.

The abrasive filamentary particles of this invention should have an aspect ratio, i.e. the ratio between the length along the principal or longer dimension and the greatest extent of the filament along any dimension perpendicular to the principal dimension, of at least about 1:1. Where the cross-section is other than round, e.g. polygonal, the longest measurement perpendicular to the lengthwise direction is used in determining the aspect ratio.

Preferably, the average aspect ratio ranges from about 2:1 to about 8:1, although longer filaments are also useful in many applications. The filaments most useful in the practice of the invention have a hardness of at least 16 GPa and preferably at least 18 GPa for most applications (Vickers indenter, 500gm load), and are preferably at least 90% and usually most preferably at least 95% of theoretical density. Pure dense alpha alumina has a hardness of about 20–21 GPa. In some instances, at least, the abrasive filaments used in the practice of the invention may have a twist or curl in their lengthwise dimension, or be somewhat curved or bent.

It is believed that curved or twisted abrasive filaments may be superior to their straight counterparts in bonded abrasive applications because the curved or twisted configuration would make the abrasive filaments so shaped more difficult to pull out of its bond. In addition, such curled or twisted abrasive filaments make it easier to obtain desired ranges of loose packed density in a grinding wheel. The diameter of the abrasive filaments can be as high as about 1.5 mm. The abrasive filaments of the present invention have been found to produce bonded abrasive products that are far superior to the same products containing crushed fused and sintered abrasive grain which have a cross section (grit size) about equal to the diameter of the abrasive filament.

The abrasive filamentary particles of the invention may be used in bonded abrasive products, such as grinding wheels, segments, and sharpening stones, which are comprised of a bond and sintered sol gel abrasive filaments. The amounts of bond and abrasive may vary, on a volume percent basis, from 3% to 76% bond, 24% to 62% abrasive, and 0% to 73% pores. As can be seen from these volume percent compositions, the filament shaped abrasive allows the production of bonded abrasive products with significantly higher structure numbers in softer grades than were heretofore possible with conventionally shaped equiaxed abrasive. However, conventional pore inducing media such as hollow glass beads, solid glass beads, hollow resin beads, solid resin beads, foamed glass particles, bubble alumina, and the like, may be incorporated in the wheels thereby providing even more latitude with respect to grade and structure number variations.

The abrasive products may be bonded with either a resinoid or vitrified bond. The preferred resinoid bonds are based on phenol-formaldehyde resin, epoxy resin, polyurethane, polyester, shellac, polyimide, phenoxy, polybenzimidazole or mixtures thereof. The bonds may include from 0% to 75% by volume of any one or several fillers or grinding aids as is well known in the art. When the bond is of the resinoid type, suitable fillers include cryolite, iron sulfide, calcium fluoride, zinc fluoride, ammonium chloride, copolymers of vinyl chloride and vinylidene chloride, polytetrafluoroethylene, potassium fluoroborate, potassium sulfate, zinc chloride, kyanite, mullite, nepheline syenite, molybdenum disulfide, graphite, sodium chloride, or mixtures of these various materials.

Vitrified bonds, while amenable to the incorporation of fillers therein, somewhat limit the number of fillers which are useful because of the relatively high temperatures which are required to mature such bonds. However, fillers such as kyanite, mullite, nepheline syenite, graphite, and molybdenum disulfide may be used depending on the maturing temperature of a particular vitrified bond. Vitrified bonded wheels may also be impregnated with a grinding aid such as molten sulfur or may be impregnated with a vehicle, such as epoxy resin, to carry a grinding aid into the pores of the wheel.

In making coated abrasive products using the abrasive filaments of the invention, the abrasive filaments are attached to a flexible backing proximate one end of the filament by an adhesive maker coat. The filaments extend generally away from the backing and are normally over-coated with size coat to further anchor them into the backing. The backing may be formed of any of the known backing used for coated abrasives, such as, for example, woven or stitch bonded fabrics, film or paper. A variety of well known cloth or paper finishing methods and materials are used in the industry to prepare the backing, depending on the application, and are equally applicable to the coated abrasive backings used in the present invention. Similarly any of the well known standard maker coats used in coated abrasive manufacture may be used.

If the average aspect ratio of the abrasive filaments of the invention can be, e.g. 1.5:1 to 6:1 or even higher, the size coat may be applied by standard roll coating techniques. If the abrasive filaments have a longer aspect ratio it is preferred to coat by other means, such as spray coating, which will not squash down the filaments excessively. The materials used for the size coating may also be of any of the known types used in the coated abrasive industry.

It has been found that the coated abrasives of the present invention have substantially longer lives than those incorporating the crushed grits of the prior art. They also tend to cut at a less variable rate and impart a less variable surface finish to the work piece over their useful lives than do prior art coated abrasives.

Unexpectedly, it has also been found that the use of coated abrasives incorporating the abrasive filaments of the present invention are particularly effective in low pressure grinding operations.

A unique advantage of the invention is that not only can coated abrasive products be provided having various length abrasive filaments as desired, but the size distribution for a particular application can be as exact or varied as desired, something not heretofore obtainable with roll crushed abrasive grain.

A further advantage is that in coated abrasive products incorporating the abrasive filaments of the invention, the filaments may be cut to a variety of lengths or aspect ratios, to simulate a standard CAMI graded filament blend. Alternatively, the coated abrasives can have a designed blend of over grade, control and fine diameter abrasive filaments.

Another advantage in the use of abrasive filaments is that there is no waste such as occurs with conventional crushed grits so that the manufacturing operations are more economical and efficient.

The abrasive filaments of the invention and the bonded and coated products containing said abrasive are, in general, superior to prior art abrasives as the following examples show. The abrasive products are suitable for grinding all types of metal such as various steels like stainless steel, cast steel, hardened tool steel, cast irons, for example ductile iron, malleable iron, spheroidal graphite iron, chilled iron and modular iron, as well as metals like chromium, titanium, and aluminum. As is the case with all abrasives and the bonded or coated products containing them, the abrasive and bonded products of the invention will be more effective grinding some metals than others and will be more efficient in some grinding applications than in others.

EXAMPLES OF THE PREFERRED EMBODIMENTS

Example I

In this example, 196.4 kg Pural ® NG alumina monohydrate powder obtained from Condea Chemie GMBH, 38.2 kg milled water containing 1.37 kg alpha alumina seeds, and 28.8 kg distilled water were mixed in a conventional double shell V-blender for five minutes to form a substantially uniform slurry. At this point, 16 kg of (70% concentration) nitric acid diluted with 44.6 kg of distilled water were added to the mixer while the mixing blades were in motion. After about five minutes of additional mixing, the sol was converted to a gel containing about 61% solids and including substantially uniformly dispersed seeds. The seeds in this example were prepared by milling a charge of distilled water in a model 45 Sweco mill with regular grade 88% alumina grinding media (each 12 mm diameter by 12 mm long) obtained from Diamonite Products Company, Shreve, OH, until the particulates (alumina seeds) in the water reached a specific surface area of at least 100 $M^2/g$.

The Pural ® NG powder used had a purity of about 99.6% with minor quantities of carbon, silica, magnesia, and iron oxide.

The seeded gel was conventionally extruded through a smooth walled die with multiple holes about 1.19 mm in diameter to produce continuous gel filaments. The gel filaments were then dried for 24–72 hours at a temperature of 75° to 80° C. and a relative humidity of >85%. After this drying step, the filaments were relatively brittle and could easily be crushed or broken into short lengths. For this example, the filaments were converted into fibrous bodies with an average length of 2 mm to 8 mm. These short filaments were then converted to alpha alumina by heating at a rate of <2° C. per minute to 800° C., at a rate of about 5° C. per minute from 800° C. to 1370° C., held at the latter temperature for 5 minutes, and then allowed to cool. After cooling, the filaments had an average diameter of about 0.58 mm and random lengths from about 1.5 mm to 6 mm and were substantially pure alpha alumina, with an average crystallite size of 0.3 microns and a Vickers hardness of above about 16 GPa. All crystallite sizes are measured herein by the intercept method.

These filaments as described last above were just slightly smaller in diameter than a standard 30 grit abrasive grit. These fibrous grits were made by conventional means into vitreous bonded grinding wheels according to the teachings of commonly-owned U.S. Pat. No. 4,543,107 to Rue. Comparison grinding wheels were made from 30 grit fused 32A (sulfide process) abrasive grits sold by Norton Company, Worcester, Massachusetts. These test grinding wheels were made 7" (178 mm) in diameter, ½" (12.7 mm) thick and with 1-¼" (31.75 mm) hole. The total volume percent abrasive in each wheel was held constant at 48% and the volume percent vitreous bond of composition A (see Table I) was held constant at 7.21%.

TABLE I

| Fused Oxide Composition of Bond A | |
|---|---|
| $SiO_2$ | 47.61 |

TABLE I-continued

| Fused Oxide Composition of Bond A | |
|---|---|
| $Al_2O_3$ | 16.65 |
| $Fe_2O_3$ | 0.38 |
| $TiO_2$ | 0.35 |
| CaO | 1.58 |
| MgO | 0.10 |
| $Na_2O$ | 9.63 |
| $K_2O$ | 2.86 |
| $Li_2O$ | 1.77 |
| $B_2O_3$ | 19.03 |
| $MnO_2$ | 0.02 |
| $P_2O_5$ | 0.22 |
| | 100.00 |

An example of an alternative vitrified bond which may be used is that disclosed in pending U.S. Pat. application Ser. No. 07/236,586 filed Aug. 25, 1988 which is assigned to the same assignee as is the present invention. An example of such a bond is designated as 3GF259A, so designated and sold by the O. Hommel Company of Pittsburgh, PA. This fritted bond is made up of 63% silica, 12% alumina, 1.2% calcium oxide, 6.3% sodium oxide, 7.5% potassium oxide, and 10% boron oxide, all on a weight percent basis. The mix and green wheels are formed in the conventional manner and the latter fired at 900° C. to mature the bond, the firing cycle being a 25° C./hr. rise from room temperature to 900° C., a soak at 900° C. of 8 hours, and a free rate of cooling down to room temperature.

After mixing the abrasive grits with the glass bond ingredients, the test wheels were pressed to shape in steel molds to the desired 44.79% porosity. The wheels were then fired to 900° C. in 43 hours, held at this temperature for 16 hours and allowed to cool to room temperature. The fired wheels were trued and faced to ¼" (6.35 mm) width in preparation for a slot grinding test. The invention, fibrous abrasive wheels were marked SN119 and the comparison conventional fused abrasive wheels were marked 32A30. The material ground was D3 tool steel hardened to Rc60, the length of slot ground was 16.01 inches (40.64 cm). The tests were made using a Brown and Sharpe surface grinder with the wheel speed set at 6000 sfpm (30.48 smps) and table speed set at 50 fpm (0.254 mps). Tests were conducted at three downfeeds: 1, 2, and 3 mils per double pass (0.025 mm, 0.051 mm, and 0.076 mm) all for a total of 60 mils (1.524 mm). Wheel wear, metal removal, and power, was measured at each infeed rate. The term G-ratio, as used in Table II and subsequently, is the number which results from dividing the volumetric metal removed by the volumetric wheelwear for a given grinding run; the higher the quotient the greater is the quality of the wheel.

Test results are shown in Table II.

TABLE II

Dry Slot Grinding Results on D3 Steel

| Abrasive (type) | Wheel No. | Feed (mils) | G-Ratio (S/W) | Specific Power (Hp/ in 3 min) | Joules/ mm3) |
|---|---|---|---|---|---|
| Fused (blocky) | 32A30 | 1 | 4.0 | 7.09 | 19.35 |
| | | 2 | 4.25 | 9.02 | 24.62 |
| | | 3 | stalled wheel | | |
| Sintered (extruded filaments) | SN119 | 1 | 30.28 | 5.11 | 13.95 |
| | | 2 | 21.31 | 4.91 | 13.40 |
| | | 3 | 48.16 | 8.94 | 24.41 |

In dry grinding of type D3 steel at a wheel speed of 6000 surface feet per minute, the wheels were made with abrasive grits according to this invention had five to ten times the life and used less power to remove a unit volume of steel than the best conventional fused blocky abrasive grits of similar cross-sectional diameter.

The advantage of the wheels with elongated filament shaped grits made according to this invention was particularly marked at high metal removal rates. For a given grinding grade, the filament shaped abrasive containing wheels were much freer cutting as the lower power levels in Table II indicate and generated less heat, which in turn produces a burn free finish on the work piece. Low heat and lack of burn are necessary to avoid metallurgical damage to the cutting tool being fabricated.

Example II

In this example, vitrified bonded segments were made with the same grains as described in Example I. These segments were made to fit a 12" (30.48 cm) diameter CORTLAND chuck. Each segment was 5" (12.7 cm) in height and had a cross-section equal to the chordal section of a 12" (30.48 cm) circle where the chord length is 7.5" (19.05 cm). The segments were made in the same manner as the wheels of Example I. A grinding test comparing the invention abrasive to the currently used best fused abrasive was made on 12" (30.48 cm) square steel plates of 1018 steel utilizing a BLANCHARD vertical spindle surface grinder. Grinding was done wet with a 1:40 ratio of water-soluble oil to water.

Three downfeed rates were tested: 0.016"/min (0.406 mm/min), 0.022"/min (0.559 mm/min), and 0.028"/min (0.711 mm/min) and in each case, four runs were made each of 100 mils (2.54 mm) total downfeed. Wheel wear, metal removal, and power were measured for each run. The total results are given in Table III.

TABLE III

Segment Surface Grinding Results on 1018 Steel

| Abrasive (type) | Segment No. | Feed Rate (mils/min) | Feed Rate (mm/min) | G-Ratio (S/W) | Power (Kw) |
|---|---|---|---|---|---|
| Fused (blocky) | 32A30s | 16 | 0.406 | 7.44 | 8.4 |
| | | 22 | 0.559 | 5.75 | 12.0 |
| | | 28 | 0.711 | 4.48 | 12.0 |
| Sintered (extruded filaments) | SN119s | 16 | 0.406 | 34.32 | 8.8 |
| | | 22 | 0.559 | 12.64 | 9.2 |
| | | 28 | 0.711 | 12.64 | 9.6 |

As can be seen from the results shown in Table III, the segments made from the invention filament shaped abrasive outperformed the best fused abrasive now in use by 300 to 500% in G ratio while drawing significantly less power at the higher infeed rates.

Example III

In this example, a batch of smaller diameter filament shaped abrasive was made by mixing 3.2 kg Pural® NG alumina monohydrate, with 1.3 kg of milled water containing 22 g of alpha alumina seeds as in Example I. After 5 minutes of mixing, 200 g of 70% nitric acid diluted with 750 cc distilled water was added and mixing continued for an additional five minutes to form a 59% solids gel in which the seeds were uniformly dispersed. The seeded gel was then conventionally extruded through a multiple opening smooth walled die whose openings were 0.60 mm in diameter. After drying, the extruded strands were broken to lengths averaging 3 mm then fired to 1320° C. for five minutes.

After firing the individual filaments cross-sectional size was equivalent to a standard 50 grit abrasive. The firing temperature of 1320° C. for 5 minutes was slightly less than that of Example I. Also, as in Example I, the filaments were bent and twisted. These filaments were made into test wheels following the procedure of Example I except that the wheel diameter was 5" (127 mm) and comparison wheels were made with a seeded sol gel alumina abrasive of the same composition as the filament shaped abrasive but produced by breaking up dry cakes to form blocky shaped grain similar to the shape of fused alumina grain. The invention filament shaped abrasive containing wheels were marked X31-1 and the blocky sol gel grain wheels marked SN5. These wheels were tested by slot-grinding hardened D3 steel as in Example I. The results are shown in Table IV.

TABLE IV

Dry Slot Grinding Results on D3 Steel

| Abrasive (type) | Wheel No. | Feed (mils) | G Ratio (S/W) | Specific Power (Hp/ in 3 min) | (Joules/ mm3) |
|---|---|---|---|---|---|
| Sol Gel (blocky) | SN5 | 0.5 | 24.3 | 23.0 | 62.8 |
|  |  | 1.0 | 35.8 | 15.5 | 42.3 |
|  |  | 2.0 | 28.8 | 10.6 | 28.9 |
| Sol Gel (extruded filaments) | X31-1 | 0.5 | 26.27 | 18.2 | 49.7 |
|  |  | 1.0 | 48.58 | 12.9 | 35.2 |
|  |  | 2.0 | 73.78 | 8.7 | 23.75 |

These results clearly show the advantage of the filament shaped sol gel alumina abrasive over the sol gel alumina abrasive with blocky shape grains. At the highest infeed rate, the invention grains had 255% higher G ratio and drew 18% less power.

Example IV

Four sets of standard type hot pressed phenolformaldehyde resin bonded portable grinding wheels were made in the conventional mode and measured 6 inches (15.24 cm) in diameter, 0.625 inches (1.59 cm) in thickness, and had a 0.625 inch (1 59 cm) hole. One set of wheels contained the confused alumina-zirconia blocky shaped abrasive (AZ) of U.S. Pat. No. 3,891,408; a second set of wheels contained the blocky shaped seeded sol gel alumina abrasive (SGB) of U.S. Pat. No. 4,623,364 in 16 grit (U.S. Standard Sieve Series); and a third set of wheels contained the filament shaped seeded sol gel alumina abrasive (SGF) described above in Example I but having a diameter of 0.074 inches (1.5 mm). All of the wheels were essentially the same except for the abrasive type; they were a relatively hard grade having a volume structure composition of 48% abrasive, 48% bond and 4% pores. All the wheels were used in a grinding process which simulated conditions used to grind railroad tracks. The results were as follows, using the wheels containing the well known confused alumina-zirconia (AZ) abrasive as the reference.

TABLE V

Rail Grinding Test Relative Results - %

| Abrasive Variation | Constant Power | Wheel Wear Rate | Material Removal Rate | KW | G Ratio |
|---|---|---|---|---|---|
| AZ | 1.7 KW | 100.0 | 100.0 | 100.0 | 100.0 |
| SGB |  | 239.9 | 116.8 | 106.7 | 48.6 |
| SGF |  | 140.2 | 141.6 | 107.8 | 101.0 |
| AZ | 2.2 KW | 100.0 | 100.0 | 100.0 | 100.0 |
| SGB |  | 286.4 | 117.7 | 101.2 | 41.1 |
| SGF |  | 149.1 | 137.2 | 103.8 | 92.0 |

TABLE V-continued

Rail Grinding Test Relative Results - %

| Abrasive Variation | Constant Power | Wheel Wear Rate | Material Removal Rate | KW | G Ratio |
|---|---|---|---|---|---|
| AZ | 2.3 KW | 100.0 | 100.0 | 100.0 | 100.0 |
| SGB |  | 152.7 | 99.0 | 101.4 | 64.8 |
| SGF |  | 140.0 | 128.2 | 99.6 | 91.5 |
| AZ | 2.5 KW | 100.0 | 100.0 | 100.0 | 100.0 |
| SGB |  | 248.3 | 107.5 | 103.1 | 43.3 |
| SGF |  | 117.5 | 120.9 | 103.5 | 102.9 |

As can be seen from the G-Ratios i.e. the volumetric material removal rate per unit of wheelwear, the overall quality of the currently used AZ abrasive was much superior to the blocky shaped seeded sol gel abrasive, and the filament shaped seeded sol gel abrasive described herein is only equivalent to the AZ. However, in rail grinding it is critical that the railroad tracks are out of service for as short a time as possible due to the necessity of reconditioning the tracks by grinding. Thus the rate at which a grinding wheel removes metal becomes the governing factor in evaluating the quality of a rail grinding wheel. The metal removal rate of the wheels containing the filament shaped seeded sol gel abrasive was vastly superior to that of both the AZ abrasive and the blocky shaped seeded sol gel abrasive. In the several grinding runs the filament shaped abrasive was about 42%, 37%, 28% and 21% superior to AZ in metal removal weight, and about 25, 20, 29, and 13 percentage points better than the blocky shaped seeded sol gel abrasive containing wheels. Why the filament shaped seeded sol gel abrasive is even superior to its blocky shaped counterpart is not fully understood but the difference was pronounced.

Example V

A series of commercial type phenol-formaldehyde resin bonded cut-off wheels were manufactured according to well known methods. The wheels measured 20×0.130×1 inch (50.8×0.33×2.54 cm) and were side reinforced with glass cloth disc having a radius about ½ the radius of the wheel, i.e. the reinforcing cloths had a diameter of about 10 inches. A third of the wheels were made with a 24 grit (based on U.S. Standard Sieve Series) blocky shaped fused crushed alumina sold by Norton Company and known as 57 ALUNDUM (57A), ALUNDUM being a registered trade mark of the Norton Company. A third of the wheels contained the blocky shaped 24 grit seeded sol gel abrasive described by the Cottringer et al. U.S. Pat. No. 4,623,364 (SGB) mentioned above. The last one third of the number of wheels contained the filament shaped seeded sol gel alumina abrasive of the instant invention (SGF) having a cross section about equal to the diameter of the 24 grit equiaxed 57A and blocky seeded sol gel abrasive, i.e. about 0.74 mm. On a volume basis, all of the wheels contained 48% abrasive, 46% bond, and 6% pores.

The wheels were tested dry cutting 1.5 inch (3.81 cm) thick C 1018 steel and 1.5 inch (3.81 cm) thick 304 stainless steel. The wheels were tested on a stone M150 cut-off machine and were run at 12,000 surface feet per minute with 20 cuts made at both 2.5 and 4 seconds per cut with each wheel on the C1018 steel and on the 304 stainless steel bars. The comparative test results cutting C1018 steel and 304 stainless steel are shown in Tables VI and VII respectively.

TABLE VI

| Wheel No. | Abrasive Type | Material Cut - C1018 Steel | | | | | Relative G-Ratio % |
|---|---|---|---|---|---|---|---|
| | | Time Cut Sec | Mr In 3/ Min | WW In 3/ Min | G Ratio | KW | |
| 1 | 57A | 2.5 | 5.47 | 0.82 | 6.67 | 14.26 | 100 |
| 2 | " | 2.5 | 5.43 | 0.81 | 6.67 | 13.97 | 100 |
| 3 | " | 4.0 | 3.45 | 0.75 | 4.58 | 9.27 | 100 |
| 4 | SGB | 2.5 | 5.47 | 0.51 | 10.79 | 12.67 | 193.4 |
| 5 | " | 2.5 | 5.51 | 0.51 | 10.79 | 13.20 | 193.4 |
| 6 | " | 4.0 | 3.42 | 0.40 | 8.65 | 8.79 | 180.9 |
| 7 | SGF | 2.5 | 5.51 | 0.32 | 17.24 | 11.90 | 258.5 |
| 8 | " | 2.5 | 5.39 | 0.25 | 21.54 | 11.95 | 322.9 |
| 9 | " | 4.0 | 3.37 | 0.16 | 21.54 | 8.04 | 386.0 |

Cutting C1018 steel, the wheels containing the filament shaped seeded sol gel alumina abrasive (SGF) were profoundly superior in, overall quality and G-Ratio to the wheels containing the fused alumina 57A abrasive and to the wheels containing the blocky shaped abrasive SGB counterpart of the SGF material. When the cutting time was 2.5 seconds the SGF wheels had G-Ratios 158.5 percentage points higher than the corresponding 57A wheels, and 370.3 percentage points higher when the cutting time was 4 seconds. The advantage of the SGF over the SGB, though not as great as that over the 57A, it was still very large viz. 93.4 percentage points when the cutting time was 2.5 seconds, and 271.9 percentage points when the cutting time was 4 seconds. It should also be noted that in addition to much higher grinding quality (G-Ratio) the SGF wheels drew significantly less power, in terms of kilowatts (KW) than did either the 57A or SGB abrasives. The power total for all three SGF wheels tested was 31.89 kilowatts, for the three SGB wheels 34.66, and for the three 57A wheels 37.55. The SGF abrasive resulted in power savings of 15.1% as compared to the 57A containing wheels, and a 7.9% savings over wheels containing the SGB abrasive.

TABLE VII

| Wheel No. | Abrasive Type | Material Cut - 304 Stainless Steel | | | | | Relative G-Ratio % |
|---|---|---|---|---|---|---|---|
| | | Time Cut Sec | MR In 3/ Min | WW In 3/ Min | G Ratio | KW | |
| 10 | 57A | 2.5 | 5.51 | 1.08 | 5.11 | 12.96 | 100 |
| 11 | " | 2.5 | 5.39 | 0.92 | 5.85 | 12.06 | 100 |
| 12 | " | 4.0 | 3.45 | 0.48 | 7.22 | 8.94 | 100 |
| 13 | " | 4.0 | 3.42 | 0.39 | 8.66 | 9.12 | 100 |
| 14 | SGB | 2.5 | 5.64 | 0.52 | 10.79 | 12.43 | 211.2 |
| 15 | " | 2.5 | 5.51 | 0.51 | 10.85 | 12.34 | 185.5 |
| 16 | " | 4.0 | 3.50 | 0.20 | 17.24 | 9.09 | 238.9 |
| 17 | " | 4.0 | 3.45 | 0.20 | 17.24 | 8.61 | 200.5 |
| 18 | SGF | 2.5 | 5.34 | 0.37 | 14.43 | 11.81 | 282.4 |
| 19 | " | 2.5 | 5.30 | 0.37 | 14.43 | 12.48 | 246.7 |
| 20 | " | 4.0 | 3.39 | 0.16 | 21.54 | 8.82 | 298.3 |
| 21 | " | 4.0 | 3.31 | 0.15 | 21.54 | 8.43 | 248.7 |

As With cutting C1018 steel, the SGF containing wheels vastly outperformed wheels containing the normally used 57A fused crushed alumina abrasive and were significantly better than the SGB abrasive containing wheels. At 2.5 seconds per cut the SGF wheels had G-Ratios of 182.4 and 146.7 percentage points higher than the 57A wheels, and at 4 seconds per cut those same differences Were 198.3 and 148.7 percentage points in favor of the SGF wheels. As compared to the SGB containing wheels, the SGF wheels quality advantages of 71.2 and 61.2 percentage points when the time per cut was 2.5 seconds, and 59.4 and 48.2 percentage points when the time per cut was extended to 4 seconds. With respect to power consumption, the SGF containing wheels did, for the most part, result in a power savings as compared to the 57A and SGB wheels but the savings was relatively small.

Example VI

Four sets of commercial type phenol-formaldehyde resin bonded cut-off wheels measuring 20×0.130×1 inch (50.8×0.22×2.5 cm) and side reinforced with glass cloth discs having a radius ½ the radius of the wheel, were manufactured in the conventional manner. The wheels had a volume percent composition of 50% abrasive, 32% bond, and 18% pores. The first set of wheels, a fused crushed blocky shaped alumina abrasive known as 53 ALUNDUM (53A), ALUNDUM being a registered trademark of the Norton Company of Worcester, Massachusetts, the abrasive was 50 grit, based on U.S. Standard Sieve Series. The second set of wheels contained the blocky shaped sintered seeded sol gel abrasive (SGB) of the Cottringer et al. U.S. Pat. No. 4,623,364 which was also 50 grit. The third and fourth sets of wheels contained the filament shaped sintered seeded sol gel abrasive described above in Example I but having a cross section about equal to the diameter of the 50 grit equiaxed 53A and blocky shaped seeded sol gel abrasive. All seeded sol-gel abrasives had submicron sized crystallites. The abrasive in both of these latter sets of wheels had a diameter of about 0.011 inch (0.28 mm) but wheels 26 and 27 had an average aspect ratio of 9 while wheels 28 and 29 had an average aspect ratio of 6; these wheels are identified as SGF(a) and SGF(b), respectively, in Table VIII below.

An oscillating Campbell #406 cutting machine was used to cut 4 inch (10.16 cm) diameter 4340 steel rolls. The cutting was done while flooding the cutting area with water, using an oscillation of a 1.62 inch (4.12 cm) travel at 57 cycles per minute, and times of cut of 1 and 2 minutes. The cutting was done at a wheel speed of 9870 surface feet per minute. The results were as follows:

TABLE VIII

| Wheel No. | Abrasive Type | Material Cut - 4340 Stainless Steel | | |
|---|---|---|---|---|
| | | Time/Cut Sec | Avg. Relative G-Ratio | Avg. Relative Power |
| 22 | 53A | 60 | 100 | 100 |
| 24 | SGB | 60 | 113 | 97 |
| | | 60 | | |
| 26 | SGF(a) | 60 | 319 | 101 |
| | | 60 | | |
| 28 | SGF(b) | 60 | 335 | 102 |
| | | 60 | | |
| 23 | 53A | 120 | 100 | 100 |
| 25 | SGB | 120 | 99 | 84 |
| 27 | SGF(a) | 120 | 350 | 103 |
| | | 120 | | |
| 29 | SGF(b) | 120 | 401 | 102 |
| | | 120 | | |

G-Ratio = volumetric ratio of material removed to wheelwear.

At a time per cut of 60 seconds both filament shaped sintered seeded sol gel abrasives SGF(a) and SGF(b) containing wheels outperformed the widely used fused crushed 53A alumina abrasive and the blocky shaped sintered seeded sol gel abrasive SG. The SGB abrasive containing wheel did show a G-ratio 13 percentage points higher than the 53A wheel but the SGF(a) and SGF(b) wheels were respectively 219 and 235 percentage points superior to the standard 53A wheels. When the time to cut through the 4 inch (10.2 cm) diameter was slowed to 120 seconds the 53A and SGB were about the same in quality but the two wheels containing the filament shaped sintered seeded sol gel alumina abrasives, SGF(a) and SGF(b), were 3.5 and 4 times higher in quality than the 53A and SGB wheels. There was no substantial difference in power consumption between the two SGF abrasives of the invention, and the SGB and 53A abrasives. However, even a 25-30% lower power consumption on the part of the SGB and 53A abrasives containing wheels would pale in significance in light of the 219 to 301 percentage point advantage of the filament shaped sintered seeded sol gel abrasives.

A further utility for the seeded gel filament shaped abrasive was in a coated abrasive product where it showed an unexpected ability to maintain a high rate of cut longer than did the roll crushed SG abrasive.

Example VII

This example compares the cut and finish of filament shaped seeded gel (SG) aluminum oxide abrasive particles against SG abrasive grain obtained by conventional roll crushing. The filament shaped abrasive particles had an average diameter (0.013") approximately equal to 50 grit abrasive grains (0.01369) and was of random aspect ratio varying from about 2:1 to about 8:1. Nevertheless, the batch grading used resulted in some very long filaments and a disproportionately high number of fines as indicated below. The composition of the abrasive filaments and the 50 grit SG 2011 crushed control was the same.

TABLE IX

Grading Results of Rolled Crushed Grain vs. Abrasive Filaments

| Grain type | Serial No. | Grit | Grade | LPD |
|---|---|---|---|---|
| Roll Crushed | 08D168.3 | 50 | +3.2 + 1.9 | 180.7 |
| Abr. Filaments | 08D168.7 | 50 | −2.5 + 30.9 | 209.1 |

As can be seen from the above table, the variation in the grading of the two different abrasive "grains" varied from one another considerably. The reading of "+3.2+1.9" means that the sample of the roll crushed abrasive grain was 3.2% high in overgrade and 1.9% high in fines, as tested using the CAMI grading screen system. Such is within the tolerance deemed allowable for 50 grit SG abrasive grain. On the other hand, the reading of "−2.5+30.9" for the sample of the abrasive filaments indicates that the sample was 2.5% low in overgrade and 30.9% high in fines, a disproportionate value. The high reading on the fines end results from the abrasive filaments ("grains") all being of the same shape. The lower the number the larger the approximate diameter which is less than the size of the 50 grit control screen.

Fiber discs were prepared in the conventional manner. The coating weights were approximately: maker coat 15#/RM, size coat 23#/RM, abrasive filaments 65grams, roll crushed grain 52 grams.

The fiber discs made, after being conventionally flexed, were first evaluated in a low pressure dulling test. The results showing the comparative cut and finish are set forth in Table X below:

TABLE X

Comparative Cut & Finish on 3" Flat Plate For Filament Shaped Abrasive Against Roll Crushed Grain

| | Cut | | | | Finish | | | | | |
|---|---|---|---|---|---|---|---|---|---|---|
| | SG Control 50 Grit | | Filmt. Shaped 50 Grit | | SG Control 50 Grit | | | Filmt. Shaped 50 Grit | | |
| Time Interval No. | Cut Intvl. GMS | Accum. Cut GMS | Cut Intvl. GMS | Accum. Cut GMS | Surface Finish | | | Surface Finish | | |
| | | | | | Ra | Rtm | Pc | Ra | Rtm | Pc |
| 1 | 29 | 29 | 20 | 20 | 164 | 1005 | 227 | 125 | 995 | 211 |
| 2 | 26 | 55 | 17 | 37 | 105 | 736 | 265 | 103 | 855 | 233 |
| 4 | 18 | 94 | 15 | 68 | 80 | 625 | 163 | 109 | 757 | 156 |
| 6 | 12 | 119 | 10 | 92 | 48 | 414 | 115 | 53 | 386 | 82 |
| 8 | 8 | 136 | 9 | 112 | 37 | 331 | 103 | 33 | 268 | 73 |
| 10 | 4 | 146 | 8 | 128 | 34 | 282 | 96 | 28 | 222 | 91 |
| 12 | — | — | 7 | 143 | — | — | — | 28 | 193 | 92 |
| 14 | — | — | 5 | 154 | — | — | — | 40 | 297 | 81 |

Ra = DEVIATION FROM MEAN LINE IN MICRONS
Rtm = MEAN PEAK TO VALLEY HEIGHT IN MICRONS
Pc = NUMBER OF PEAKS

The finish quality of a metal workpiece is commonly measured by the the Ra and Rt values taken from traces at various spots (e.g. at the center and at the left, right edges) along the finished piece. The meaning of these statistical parameters is well known to those skilled in the art. Such are clearly defined in a publication entitled "An Introduction to Surface Texture and Part Geometry" by Industrial Metal Products Incoporated (IMPCO), the complete disclosure of which is incorporated herein by reference. In general, Ra is a measure of average surface roughness. Since many surfaces of differing topography might yield similar Ra values, this number is usually supplemented by other parameters generated from the same surface. In the metal finishing art, Rt is often employed to supplement the Ra measurement. The value of Rt is a measure of the depth of gauges or scratches that might remain on the workpiece surface after the finishing operation. Pc is a number indicating, in general, the frequency of scratches.

As can be seen from the above data, the disc having the abrasive filaments therein outperformed in cut the discs having conventional roll crushed abrasive grain. Initially, the abrasive filament disc cut at a somewhat lower rate for the first few intervals but then continued to cut at a sustained rate for a much longer time. The surface finish generated by the abrasive filaments appears about equal to that of the roll crushed grain. Nevertheless, it should be again pointed out that the batch grading of the filament shaped abrasive particles resulted in a disproportionately high number of fines, as above disclosed and some very long abrasive filaments. With more controlled "grading", a different finish would likely result.

A further test (112 DsI) was conducted to provide a comparison to the cut and the finish generated by the abrasive filaments and both 50 grit and 36 grit roll crushed abrasive grain. The results are shown in the following Table XI. The test piece has a 1" face.

TABLE XI

Comparative Cut and Finish of Abrasive Filaments Against Roll Crushed Grain on 1" Steel Face

| | Cut | | | | | | Finish | | | | | |
|---|---|---|---|---|---|---|---|---|---|---|---|---|
| | SGC 50 Grit | #952* 50 Grit | SGC* 36 Grit | SG Control 50 Grit Surface Finish | | | #952* 50 Grit Surface Finish | | | SG Control* 36 Grit Surface Finish | | |
| | ACCUM CUT IN GRAMS | | | Ra | Rtm | Pc | Ra | Rtm | Pc | Ra | Rtm | Pc |
| 1 | 41 | 31 | 44 | 152 | 1053 | 214 | 207 | 1455 | 149 | 226 | 1181 | 163 |
| 5 | 215 | 189 | 256 | 154 | 852 | 195 | 196 | 1279 | 173 | 205 | 1079 | 224 |
| 10 | 438 | 419 | 526 | 119 | 839 | 233 | 158 | 1019 | 179 | 135 | 840 | 117 |
| 15 | 627 | 640 | 779 | 136 | 1018 | 243 | 136 | 714 | 159 | 128 | 711 | 284 |
| 20 | 779 | 859 | 1001 | 63 | 599 | 353 | 124 | 730 | 196 | 129 | 820 | 145 |
| 25 | 880 | 1060 | 1181 | 41 | 420 | 320 | 92 | 581 | 230 | 75 | 526 | 179 |
| 30 | 926 | 1228 | 1334 | 42 | 254 | 100 | 80 | 423 | 152 | 73 | 534 | 181 |
| 35 | — | 1350 | 1437 | — | — | — | 87 | 477 | 139 | 54 | 394 | 168 |
| 40 | — | 1444 | 1506 | — | — | — | 48 | 431 | 200 | 70 | 359 | 181 |
| 44 | — | 1496 | 1541 | — | — | — | 73 | 489 | 96 | 80 | 503 | 115 |
| 48 | — | 1532 | — | — | — | — | 65 | 347 | 90 | — | — | — |

* = Abrasive Filaments
Ra = DEVIATION FROM MEAN LINE IN MICRONS
Rtm = MEAN PEAK TO VALLEY HEIGHT IN MICRONS
Pc = NUMBER OF PEAKS As can be seen from the above results, the 50 grit abrasive filaments not only outperformed the 50 grit roll crushed abrasive grains in cut, the cut was equal to that of the 36 grit control. Again, the abrasive filaments cut at a somewhat lower rate initially than the roll crushed grains, however, it continued to cut at a sustained rate for a longer time. With this 1" steel test, the filament shaped abrasive particles generated a finish similar to the 36 grit control.

Example VIII

This example illustrates the effect of producing the alpha alumina in situ in the form of filaments as opposed to extruding alpha alumina particles in a suitable medium and thereafter sintering to form a coherent structure.

Product according to the invention was produced by mixing boehmite (Condea's "Disperal"), with water and 1% by weight of the boehmite of submicron sized alpha alumina in a V-blender for two minutes. An 18 weight percent solution of nitric acid was then added to give 7.2% by weight of nitric acid based on the weight of the boehmite. The mixing was continued for a further five (5) minutes to produce a boehmite gel.

A series of products was then prepared for comparative purposes that corresponded to the above except that more alpha alumina (of the kind used as seed material above), was added such that total mixture had much higher proportions by weight of alumina. The boehmite was retained to give the mixture extrudability. The formulations are described in Table XII below.

TABLE XII

| Batch | Variation | % Solids |
|---|---|---|
| Comparative A | 30% alpha alumina/70% gel | |
| Comparative B* | 30% alpha alumina/70% gel | |
| Comparative D | 90% alpha alumina/10% gel | 62% |
| Comparative E | 60% alpha alumina/40% gel | 59% |
| Comparative F | 60% alpha alumina/40% gel | |
| Example 1 | 1% alpha alumina (seed) | |
| Example 2 | 1% alpha alumina (seed) | 58% |

TABLE XII-continued

| Batch | Variation | % Solids |
|---|---|---|
| Example 3 | 1% alpha alumina (seed) | |

*Additional ultrasonic mixing of slurry was used.

These materials were then extruded to form filaments that were dried and sintered under the conditions described below. Higher temperatures were required to sinter the high alpha alumina comparative batches than those produced by the seeded sol gel process. Samples of the filaments were then tested for their strength according to a simple three point process using an Instron test machine with a cross head speed of 0.2 cm/min. The filament was supported on a pair of edges spaced 1 cm apart (0.9 cm in the case of Comparatives C, D, and E). A downward pressure was applied midway between these points by a knife edge. The pressure was gradually increased until the filament broke and that pressure, divided by the cross-sectional area of the filaments, is reported in Table XIII below as the breaking strength.

TABLE XIII

| Batch | Temp/Time Firing | | Filament Diameter (mm) | $kg/cm^2$ Breaking Strength | |
|---|---|---|---|---|---|
| | | | | Average | High |
| Comp. A | 1500° C. | 30 min. | 0.32 | 6,831 | 7,465 |
| Comp. B | 1550° C. | 30 min. | 0.3175 | 6,162 | 6,268 |
| Comp. C | 1450° C. | 60 min. | 1.00 | 5,424 | 6,646 |
| Comp. D | 1300° C. | 6 min. | .88 | 3,430 | 4,036 |
| Comp. E | 1350° C. | 6 min. | .87 | 2,378 | 2,436 |
| Ex. 1 | 1370° C. | 4 min. | 0.054 | 11,197 | 13,239 |
| Ex. 2 | 1350° C. | 30 min. | 0.043 | 14,366 | 15,986 |
| | 1350° C. | 5 min. | 0.046 | 14,154 | 17,112 |
| | 1325° C. | 30 min. | 0.046 | 14,296 | 16,549 |
| | 1350° C. | 30 min. | 0.053 | 10,281 | 14,859 |
| Ex. 3 | 1350° C. | 30 min. | 0.020 | 16,000 | 18,169 |

The filaments of the Comparative batches were much thicker because it was very difficult to extrude finer filaments with dimensional integrity after extrusion and before firing. Higher proportions of alpha alumina were found to exacerbate this problem significantly.

As can be seen from a comparison of the above data, the comparative filaments had significantly lower breaking strengths and this is believed to reflect the weaker sinter bonds developed between the alpha alumina crystals as a result of the sintering process. Therefore, the preferred filaments of the invention preferably have a breaking strength of at least 8,000 and preferably at least 10,000kg per square centimeter of cross-section when measured by the test described in Example VIII. This is in contrast to o products made by sintering preformed alpha alumina where much lower strengths are obtained.

Example IX

This Example illustrates the production of filaments of a seeded sol gel according to the invention.

Twenty grams of polyethylene oxide in 200 ml of distilled water were mixed with 28 ml of water that had been Sweco-milled with alpha alumina media until the water contained 5% alpha alumina solids. This mixture was gently mixed for 16 hours. It was then added to 200 gm. of aluminum oxide monohydrate, (Condea NG), and mixed for 5 minutes in a Hobart mixer. Eighty ml. of 20 vol. % nitric acid were then added and the whole was mixed for a further 5 minutes.

The resulting mixture, which was a viscoelastic gel, was placed in a six inch diameter bowl with a plexiglass plate clamped on top. The bowl was mounted on a vertical motor shaft and enclosed in a six foot square enclosure with cross ventilation. The bowl was spun at 2500-3500 rpm and as the gel was forced outward and upward, it caused the plexiglass to be displaced and to open a gap. The gel was forced outward and elongated into filaments. Because of the very small diameter of the filaments, they dried very quickly. The fibers were collected on the screen of an exhaust port and then fired at 1350° C. for 15 minutes with an up ramp of 15° C./minute.

The collected fibers were of high purity and comprised 99%+ of very fine alpha alumina crystallites.

Example X

This Example illustrates the production of filamentary materials of other shapes than right cylinders by extrusion of a seeded sol-gel alumina material with a variety of cross-sectioned dimensions. As always in this application, where filamentary material is described, its largest cross-sectional dimension is described in terms of "grit size".

The products are described in the attached Table XIV.

TABLE XIV

| Grit Size | 110 | 24 | 24 | 28 | 24 | 50 |
|---|---|---|---|---|---|---|
| Shape (Cross-Sect.) | Square | Tube (large hole) | Tube (small hole) | Triangle | Round | Round |
| Firing °C. | 1270 | 1270 | 1270 | 1270 | 1250 | 1250 |
| Firing Minutes | 5 | 5 | 5 | 5 | 18 | 18 |
| Hardness (GPa) | 19.6 | 20.9 | 20.3 | 18.7 | 18.9 | 20.1 |
| Diameter (mm) | .14 | .89 | .89 | .71 | .91 | .33 |
| L/D | 5.8 | | | | | |
| Density* (g/cc) | 3.84 | 3.89 | 3.90 | 3.91 | 3.88 | 3.86 |
| Crystal Size (micron) | .14 | .19 | .18 | .17 | .16 | .18 |

*Evaluated using a helium pycnometer.
All the grits show excellent characteristics when used as abrasive grits.

Example XI

This example illustrates the effect of crystal size in the grinding performance of abrasives according to the invention.

The batches of abrasive grains were made by a seeded sol-gel process except for one batch ("G", where the larger crystal size was most readily attained by omission of seeding).

The characteristics of the abrasive grain were as follows:

TABLE XV

| GRAIN # | WATER DENSITY (gm/cc) | CRYSTAL SIZE* (MICRON) | SAND BLAST PENETRATION (MM) |
|---|---|---|---|
| A | 3.94 | 1.16 | 3.91 |
| B | 3.93 | 0.65 | 3.84 |
| C | 3.89 | 0.54 | 3.83 |
| D | 3.92 | 0.42 | 4.14 |
| E | 3.90 | 0.39 | 4.16 |
| F | 3.88 | 0.26 | 3.92 |
| G* | 3.95 | 2.54 | 2.99 |

*Crystal sizes throughout were measured by the Intercept method.

The diameter of the particles, which had a circular cross-section, corresponded to a 50 grit size. There were a range of aspect ratios in the samples used to make up a grinding wheel 127 mm × 12.7 mm × 31.75 mm using the same vitreous bonding material to produce the wheels. Each wheel was dressed to a square wheel face 6.4 mm in width and subjected to "dry" or "wet" grinding modes.

The "dry" grinding mode employed a D-3 steel plate approximately 100 mm × 400 mm, Rc60. The wheel speed was 6500 SFPM.

The "Wet" mode employed a 4340 hardened 100 mm × 400 mm, a White and Bagley E55 coolant in 1:40 proportions with city water, applied with a 25 mm ID flexible nozzle. The wheel speed was 8500 SFPM.

The procedure used the following parameters:
0 1. Table Speed of 15.24 m/min.
2. Downfeeds of 0.5, 1.0 and 1.5 in dry mode; and 0.5, 1.0 in wet mode.
Total Downfeeds of 100 mils.
3. Measure wheel wear (ww), metal removal rate (mrr), finish, power and force after 100 mils, (except after 100.5 mils with 1.5 mil downfeed in dry mode).
4. Dress wheels with single point diamond at 1 mil downfeed, 250 mm/min crossfeed.

The data obtained is set forth in Tables XVI and XVII below:

The comparative data relate to a commercial conventional sol-gel material with 54 grit size bonded in the same material.

TABLE XVI

| | | DRY GRINDING | | | | |
|---|---|---|---|---|---|---|
| Identif. | Down-speed (MILS) | Average Peak Power (watts) | in³/in. MRR | WW | G-Ratio | Surface Finish |
| Compar-ative: | 0.5 | 940 | 0.2470 | 0.0051 | 58.1 | 60 |
| | 1.0 | 960 | 0.5942 | 0.0096 | 62.0 | 80 |
| | 1.5 | 1120 | 0.8839 | 0.0178 | 49.8 | 100 |
| G | 0.5 | 400 | 0.1035 | 0.1652 | 0.6 | 240 |
| | 1.0 | 500 | 0.1939 | 0.3127 | 0.6 | 320 |
| | 1.5 | 640 | 0.2910 | 0.4852 | 0.6 | 300 |
| A | 0.5 | 720 | 0.2364 | 0.0430 | 5.5 | 170 |
| | 1.0 | 850 | 0.0992 | 0.0690 | 7.1 | 200 |
| | 1.5 | 1000 | 0.7182 | 0.0892 | 8.1 | 280 |
| B | 0.5 | 800 | 0.2631 | 0.0301 | 9.7 | 120 |

TABLE XVI-continued

DRY GRINDING

| Identif. | Down-speed (MILS) | Average Peak Power (watts) | in³/in. MRR | in³/in. WW | G-Ratio | Surface Finish |
|---|---|---|---|---|---|---|
| | 1.0 | 1000 | 0.5196 | 0.0514 | 10.1 | 120 |
| | 1.5 | 1120 | 0.7916 | 0.0515 | 15.4 | 260 |
| C | 0.5 | 640 | 0.2625 | 0.0238 | 11.0 | 110 |
| | 1.0 | 960 | 0.5532 | 0.0312 | 17.7 | 150 |
| | 1.5 | 1040 | 0.8239 | 0.0458 | 18.0 | 170 |
| D | 0.5 | 640 | 0.2736 | 0.0262 | 10.5 | 190 |
| | 1.0 | 920 | 0.5650 | 0.0321 | 17.6 | 180 |
| | 1.5 | 1120 | 0.8543 | 0.0317 | 26.9 | 200 |
| E | 0.5 | 480 | 0.2613 | 0.0247 | 10.6 | 190 |
| | 1.0 | 690 | 0.5550 | 0.0333 | 16.7 | 180 |
| | 1.5 | 920 | 0.8284 | 0.0471 | 17.6 | 200 |
| F | 0.5 | 680 | 0.2915 | 0.0079 | 37.1 | 170 |
| | 1.0 | 880 | 0.5838 | 0.0156 | 37.3 | 200 |
| | 1.5 | 1040 | 0.8796 | 0.0176 | 44.8 | 200 |

TABLE XVII

WET GRINDING

| Identif. | Down-speed (MILS) | Average Peak Power (watts) | in³/in. MRR | in³/in. WW | G-Ratio | Surface Finish |
|---|---|---|---|---|---|---|
| Comparative: | 0.5 | 1560 | 0.2470 | 0.0051 | 58.1 | 60 |
| | 1.0 | 1760 | 0.5942 | 0.0096 | 62.0 | 80 |
| G | 0.5 | 960 | 0.0741 | 0.2006 | 0.4 | 230 |
| | 1.0 | 960 | 0.1416 | 0.3962 | 0.4 | 200 |
| A | 0.5 | 880 | 0.1422 | 0.1193 | 1.2 | 120 |
| | 1.0 | 1040 | 0.3060 | 0.1958 | 1.6 | 120 |
| B | 0.5 | 960 | 0.2016 | 0.0453 | 4.8 | 180 |
| | 1.0 | 1120 | 0.4236 | 0.0760 | 5.6 | 110 |
| C | 0.5 | 1200 | 0.2439 | 0.0191 | 12.7 | 140 |
| | 1.0 | 1360 | 0.4524 | 0.0661 | 6.8 | 110 |
| D | 0.5 | 1440 | 0.2885 | 0.0100 | 29.0 | 120 |
| | 1.0 | 1520 | 0.5202 | 0.0169 | 30.7 | 200 |
| E | 0.5 | 1440 | 0.2883 | 0.0092 | 31.2 | 100 |
| | 1.0 | 1760 | 0.5658 | 0.0198 | 28.6 | 130 |
| F | 0.5 | 1360 | 0.2961 | 0.0043 | 69.0 | 120 |
| | 1.0 | 1480 | 0.5892 | 0.0105 | 59,1 | 120 |

From the above data it can clearly be seen that the grinding performance improves significantly as the crystallite size decreases. In addition, in the dry grinding, the harder the force applied (increased downfeed), the better the wheel ground. This is most unexpected. The general experience is that G-ratio diminishes with the applied force as the grains begin to polish and become less effective cutting edges. By contrast, the abrasive particles of the invention for the most part just kept on getting better with little extra wheel wear.

What is claimed is:

1. A sintered sol gel alumina based filament comprised of sintered alpha alumina crystals having a size no greater than 1 micron, said particles having a substantially uniform cross-section, a diameter not greater than 2 mm, an average aspect ratio of at least about 1.0 and a hardness of at least 16 Gpa.

2. An abrasive filamentary particle according to claim 1 having an aspect ratio of from 1 to 25.

3. An abrasive particle, according to claim 2, having an aspect ratio of from 1.5 to 25 and a diameter of from 0.0001 mm to 2 mm.

4. An abrasive particle, according to claim 2, wherein at least 80% of said particle comprises generally equiaxed crystals having a size no greater than 0.4 Micron.

5. An abrasive particle, according to claim 2, having a density of at least 95% of theoretical density, and including from 1% to 50% by weight of an oxide selected from the group consisting of zirconia, titania, magnesia, hafnia, ceria, spinel, mullite, manganese dioxide, precursors of these oxides, and mixtures thereof.

6. An abrasive particle, according to claim 2, wherein said alpha alumina crystals are seeded alpha alumina crystals having a size of less than 1 micron.

7. A sintered, sol-gel, filament-shaped alumina-based, abrasive particle having a substantially uniform cross-section, a diameter corresponding to grit size of 16 or smaller, a hardness of at least 18 GPa, and an aspect ratio of from 1:1 to 8:1, which is comprised of at least 80% of equiaxed alpha alumina crystals with a crystal size of no greater than 1 micron.

8. The sintered filament shaped alumina based abrasive of claim 2 wherein said filament shaped alumina based abrasive is curved in its longer dimension.

9. The sintered filament shaped alumina based abrasive of claim 7 wherein said filament shaped alumina based abrasive is curved in its longer dimension.

10. The sintered filament shaped alumina based abrasive of claim 2 wherein said filament shaped alumina based abrasive is twisted in its longer dimension.

11. The sintered filament shaped alumina based abrasive of claim 7 wherein said filament shaped alumina based abrasive is twisted in its longer dimension.

12. A sintered sol-gel filament comprised of sintered alpha alumina crystals having a size no greater than 1 micron, said filaments being substantially free of glassy components and having a substantially uniform cross-section and a hardness of at least 16 GPa and has a breaking strength of at least 8,000 kg/cm².

13. An abrasive particle formed from a filament according to claim 12, having an aspect ratio of at least 1 and a diameter of less than 2 mm.

14. An abrasive particle, according to claim 13, in which the alpha alumina crystals have a size of 0.4 micron or less.

15. An abrasive particle, according to claim 13, in which at least 80% of the alpha alumina crystals are generally equiaxed.

16. An abrasive particle, according to claim 12, that is curved in the direction of its length.

17. A metal or ceramic composite reinforced with a filament according to claim 1.

18. A method of making a sintered filament shaped alumina based abrasive containing alpha alumina crystals, said alpha alumina crystals having a size of about 1 micron or less, comprising the steps of:
   providing a gelled dispersion of submicron hydrated alumina particles;
   shaping said gelled dispersion into filaments;
   drying the filaments;
   firing said dried filaments to a temperature between 1090° C. and 1500° C. for a time selected to convert the alumina in said filaments to a ceramic body, the major portion of which is made up of alpha alumina crystals of about 2 micron or less in size.

19. The method of claim 18 wherein said gelled dispersion includes an effective amount of sub-micron seed particles for facilitating the rapid conversion of said hydrated alumina particles to alpha alumina upon sintering, said alpha alumina crystals having a crystal size of about 1 micron or less.

20. The method of claim 19 wherein said alpha alumina crystals have a crystal size of about 0.4 microns or less.

21. The method of claim 19 wherein said seed particles are selected from the group consisting of alpha alumina, alpha ferric oxide, gamma alumina, chromium oxide; precursors of alpha alumina, gamma alumina, chromium oxide, and alpha ferric oxide; and mixtures thereof, and the seed particles are present in an amount of from about 0.5% to about 10% by weight.

22. The method of claim 20 wherein said seeded particles are selected from the group consisting of alpha alumina, alpha ferric oxide, gamma alumina, chromium oxide, precursors of alpha alumina, gamma alumina, chromium oxide and alpha ferric oxide, and mixtures thereof, and the seed particles are present in an amount of from about 0.5% to about 10% by weight.

23. The method of claim 18 wherein said shaping of the gelled dispersion is done by extrusion.

24. The method of claim 18 wherein said shaping of the gelled dispersion is done by spinning.

* * * * *

UNITED STATES PATENT AND TRADEMARK OFFICE
CERTIFICATE OF CORRECTION

PATENT NO. : 5,194,072
DATED : March 16, 1993
INVENTOR(S) : Charles V. Rue, et al Page 1 of 2

It is certified that error appears in the above-indentified patent and that said Letters Patent is hereby corrected as shown below:

Column 11, line 56 of the printed patent:

delete "confused" and insert ---cofused---

Column 17, Lines 65 and 66 of the printed patent:

Under the heading % Solids delete 62% and 59%---

Column 17, Line 68 of the printed patent

Under % Solids insert ---62%---

UNITED STATES PATENT AND TRADEMARK OFFICE
CERTIFICATE OF CORRECTION

PATENT NO. : 5,194,072  
DATED : March 16, 1993  
INVENTOR(S) : Charles V. Rue, et al It is certified that error appears in the above-indentified patent and that said Letters Patent is hereby corrected as shown below:

Column 18, Line 4 of the printed patent:

Under % Solid insert —59%—

Column 19, line 7 of the printed patent:

After "to" delete ---o---

Column 22, Claim 12, Line 28 of the printed patent:

Before "micron" insert ---1---

Signed and Sealed this

Second Day of January, 1996

Attest:

BRUCE LEHMAN

Attesting Officer     Commissioner of Patents and Trademarks